(12) United States Patent
Ye

(10) Patent No.: US 11,137,907 B2
(45) Date of Patent: Oct. 5, 2021

(54) METHOD FOR DISPLAYING A VIRTUAL KEYBOARD ON A MOBILE TERMINAL SCREEN

(71) Applicant: Orange, Paris (FR)

(72) Inventor: Nan Ye, Beijing (CN)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/624,282

(22) PCT Filed: Jun. 22, 2018

(86) PCT No.: PCT/IB2018/000947
§ 371 (c)(1),
(2) Date: Dec. 18, 2019

(87) PCT Pub. No.: WO2019/002949
PCT Pub. Date: Jan. 3, 2019

(65) Prior Publication Data
US 2020/0117357 A1    Apr. 16, 2020

(30) Foreign Application Priority Data

Jun. 26, 2017 (CN) .................. PCT/CN2017/089942

(51) Int. Cl.
*G06F 3/0488* (2013.01)
*G06F 3/0484* (2013.01)
*G06F 3/0482* (2013.01)
*G06F 3/0481* (2013.01)

(52) U.S. Cl.
CPC ........ *G06F 3/04886* (2013.01); *G06F 3/0481* (2013.01); *G06F 3/0482* (2013.01); *G06F 3/0484* (2013.01); *G06F 3/04842* (2013.01)

(58) Field of Classification Search
CPC .. G06F 3/04886; G06F 3/0237; G06F 3/0488; G06F 3/04883
See application file for complete search history.

(56) References Cited

U.S. PATENT DOCUMENTS

| | | | |
|---|---|---|---|
| 8,659,569 B2* | 2/2014 | Pasquero | G06F 3/04886 345/173 |
| 2005/0154798 A1* | 7/2005 | Nurmi | G06F 3/04883 710/1 |
| 2009/0195506 A1* | 8/2009 | Geidl | G06F 3/04886 345/168 |

(Continued)

OTHER PUBLICATIONS

Jessica Conradi et al: "Optimal Touch Button Size for the use of Mobile Devices while Walking", Procedia Manufacturing, vol. 3, Jan. 1, 2015 (Jan. 1, 2015), pp. 387-394, XP055517016, ISSN: 2351-9789, DOI: 10.1016/j.promfg.2015.07.182.

(Continued)

*Primary Examiner* — Jordany Nunez
(74) *Attorney, Agent, or Firm* — Knobbe, Martens, Olson and Bear, LLP

(57) ABSTRACT

A method is described, the method relating to displaying a virtual keyboard layout to be used for typing a text on a mobile terminal. The method can include determining a movement level of the mobile terminal, selecting a virtual keyboard layout among a set of virtual keyboard layouts displayable on a screen of the mobile terminal based at least partly on the determined movement level, and displaying the selected virtual keyboard layout on the screen.

21 Claims, 3 Drawing Sheets

(56) References Cited

U.S. PATENT DOCUMENTS

| | | | |
|---|---|---|---|
| 2010/0146444 A1* | 6/2010 | Wang | G06F 3/0488 715/815 |
| 2011/0179355 A1 | 7/2011 | Karlsson | |
| 2011/0209090 A1* | 8/2011 | Meyvis | G06F 3/017 715/822 |
| 2011/0242138 A1* | 10/2011 | Tribble | G06F 3/04886 345/663 |
| 2012/0306767 A1* | 12/2012 | Campbell | G06F 3/04886 345/173 |
| 2013/0234948 A1* | 9/2013 | Jian | G06F 3/0487 345/169 |
| 2014/0164973 A1 | 6/2014 | Greenzeiger et al. | |
| 2015/0135080 A1* | 5/2015 | Ji | G06F 3/04817 715/728 |
| 2015/0293592 A1* | 10/2015 | Cheong | G06F 3/04886 345/173 |
| 2016/0202904 A1* | 7/2016 | Huang | G06F 3/04886 715/773 |
| 2016/0224240 A1 | 8/2016 | Foerster et al. | |
| 2016/0358588 A1* | 12/2016 | O'Neill | G06F 1/1694 |

OTHER PUBLICATIONS

Neil Zhao: "Full-Featured Pedometer Design Realized with 3-Axis Digital Accelerometer", Analog Dialogue 44-06, Jun. 4, 2010 (Jun. 4, 2010), p. 1, XP055375518, URL:http://www.analog.com/media/en/analogdialogue/volume-44/number-2/articles/pedometer-design-3-axis-digital-acceler.pdf.
International Search Report dated Oct. 19, 2018 for International Application No. PCT/IB2018/000947, filed Jun. 22, 2018.

* cited by examiner

METHOD FOR DISPLAYING A VIRTUAL KEYBOARD ON A MOBILE TERMINAL SCREEN

RELATED APPLICATIONS

This application is the U.S. National Phase of Application No. PCT/IB2018/000947 entitled "METHOD FOR DISPLAYING A VIRTUAL KEYBOARD ON A MOBILE TERMINAL SCREEN" and filed Jun. 22, 2018, which claims the benefit of Application No. PCT/CN2017/089942, filed Jun. 26, 2017, each of which is incorporated by reference in its entirety.

FIELD OF THE INVENTION

The field of this invention is that of mobile terminals. More particularly, the invention relates to a method for displaying a virtual keyboard on a mobile terminal screen, for use when typing text.

BACKGROUND OF THE INVENTION

Recent mobile phones (smartphones) are generally no more provided with a physical keyboard. Instead, they present a large touchscreen, covering most of their front surface, and use as an on-screen input method a software component called a "virtual keyboard".

More precisely, when in use, the virtual keyboard displays at least one keyboard layout on the screen (see the example of FIG. 1a) so as to define a "soft keyboard", i.e. a set of sensing areas corresponding to keys. Text is commonly inputted by tapping these sensing areas (so-called "soft keys").

The virtual keyboard is generally activated when required, for instance continuously when running messenger applications such as SMS, e-mails client, Whatsapp, etc., or when a textual input is requested in various applications. The virtual keyboard may comprise a dedicated soft key for hiding/revealing it.

Usually, a "default" layout of the virtual keyboard is displayed in order to type messages in this application. This layout is generally the standard keyboard layout for the set language, for instance a QWERTY-based layout (see the example of FIG. 1a) if the set language is English, or an AZERTY-based virtual keyboard layout is the set language is French.

These are full-keyboard layouts which include 26 characters plus some functional keys, like Backspace, Enter, etc. The size of each key is different according to the screen size of devices. Basically, the size of key is large enough for user to be clicked correctly, but this works only for most cases when user is standing still or sitting. When user is moving, like walking, the accuracy of clicks can be dramatically decreased. The key size of full keyboard layout is not suitable in such a situation.

In some existing applications, the virtual keyboard layout can be manually switched to other predefined keyboard layouts (for instance international keyboards layouts, i.e. layouts corresponding to other languages, or numerical keyboard layout) by the user himself. For instance, it is known to be able to switch manually from a standard QWERTY-based layout to a so-called "ABC-9-key" layout (see FIG. 1b). This "ABC-9-key" layout corresponds to the standard telephone keypad (using the ITU E 1.161 International Standard) defining the assignment of the basic 26 Latin letters (A to Z) to the 9 buttons bearing digits 1 to 9.

Such a "ABC-9-key" layout has a bigger key size and thus can ease typing when walking or running (though more taps may be needed for inputting the same text, less accuracy is needed). However, switching from the default 26-key (plus some functional keys, like Backspace, Enter, etc.) layout to the "ABC-9-key" layout requires a complex proceeding. For instance, starting from another default layout, it is necessary to:

1. Tap a dedicated soft key of the virtual keyboard to be shown available layouts. For English, the QWERTY-based layout and the ABC-9-key layout appear then depending on the tapped soft key.
2. Select the ABC-9-key layout by tapping the corresponding soft key.

Once the layout switch is done, the new settings will be used for all of the future inputs unless the user changes again manually this layout. Therefore, the user may very often have to manually switch the virtual keyboard layout, depending on his/her current moving situation, which can be tedious and impracticable. Moreover, tapping the dedicated soft key of the virtual keyboard when running may also be difficult, as explained. Besides, this process requires adding specific "switching" soft keys, for each virtual keyboard layout to be used, which reduces the space available on the screen for useful characters.

There is consequently a need for a fully automatic (i.e. not based on the user's selection) and dynamic (i.e. can be adapted to each pace indication of the user) method for decreasing the difficulties related to the use of a virtual keyboards for typing on a phone when walking or running, for carrying out efficiently a messenger conversation while offering the best user experience.

SUMMARY OF THE INVENTION

For these purposes, the present invention provides a method for displaying a virtual keyboard layout to be used for typing a text on a mobile terminal, the method comprising:

determining (a), by a processing unit of the mobile terminal, a movement level of the mobile terminal;
selecting (b), by the processing unit, a virtual keyboard layout, among a set of virtual keyboard layouts displayable on a screen of the mobile terminal, as a function of the determined movement level; and
displaying (c) the selected virtual keyboard layout on the screen.

As it will be shown, this allows switching the virtual keyboard layout directly when detecting a user's movement and assuming that the user is walking or running. This method is thus fully automated, as there is no need for manual input, very efficient, and adaptive as different layout could be selected in a short time according to the user's speed.

Preferred but non limiting features of the present invention are as follow:

the selection of the virtual keyboard layout is performed among a set of virtual keyboard layouts designed for the current display orientation mode of the screen;
the method further comprises obtaining, by the processing unit, a pace indication of a user holding the mobile terminal is obtained, said movement level being determined as a function of the pace indication;
the method further comprises receiving, by the processing unit, acceleration and/or angular velocity data from at least one sensor, and determining the pace indication from said data;

the method further comprises receiving, by the processing unit, a step count from a pedometer connected to the mobile terminal and determining the pace indication from said step count;

the movement level is selected among a plurality of predetermined movement levels, each predetermined movement level being associated to a virtual keyboard layout) of said set, the virtual keyboard layout selected at step (b) being the virtual keyboard layout associated with the movement level determined at step (a);

the predetermined movement levels are defined by threshold values of pace indication, the method further comprises comparing the obtained pace indication of the user holding the mobile terminal with said threshold values;

the more a predetermined movement level is associated with a fast user's movement, the larger is a size of keys of the virtual keyboard layout associated to this predetermined movement level;

said set of virtual keyboard layouts comprises at least a full-alphabetical layout and a ABC-9-key layout;

said set of virtual keyboard layouts further comprises a single-key layout for voice input.

In a second aspect, the invention provides a mobile terminal comprising a processing unit and a screen, the processing unit being configured to:

determine a movement level of the mobile terminal;

select a virtual keyboard layout, among a set of virtual keyboard layouts displayable on a screen of the mobile terminal, as a function of the determined movement level, for display by the screen.

In an advantageous embodiment, the processing unit is further configured to perform the selection of the virtual keyboard layout among a set of virtual keyboard layouts designed for the current display orientation mode of using said display orientation mode.

According to a third and a fourth aspects, the invention provides a computer program product, comprising code instructions for executing a method according to the first aspect for displaying a virtual keyboard layout to be used for typing a text on a mobile terminal, when executed by a processing unit of a mobile terminal; and a computer-readable medium, on which is stored a computer program product comprising code instructions for executing a method according to the first aspect for displaying a virtual keyboard layout to be used for typing a text on a mobile terminal.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 1A:
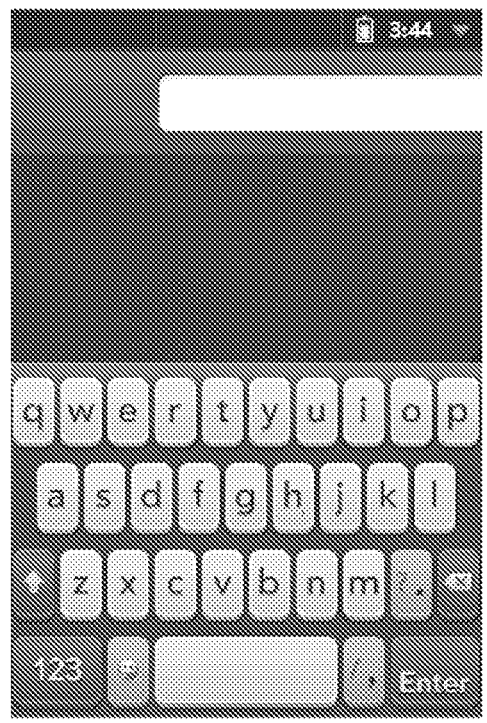
FIG. 1a, already discussed, represents an example of a virtual keyboard for a mobile terminal.
Figure 1B:
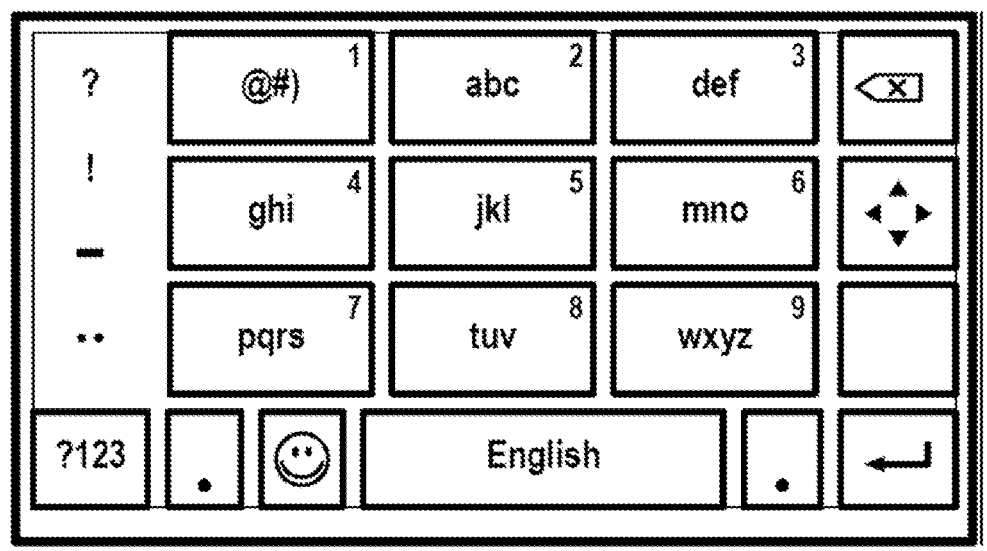
FIG. 1b, already discussed, represents an example of a virtual keyboard with an ABC-9-key layout for a mobile terminal.
Figure 2:
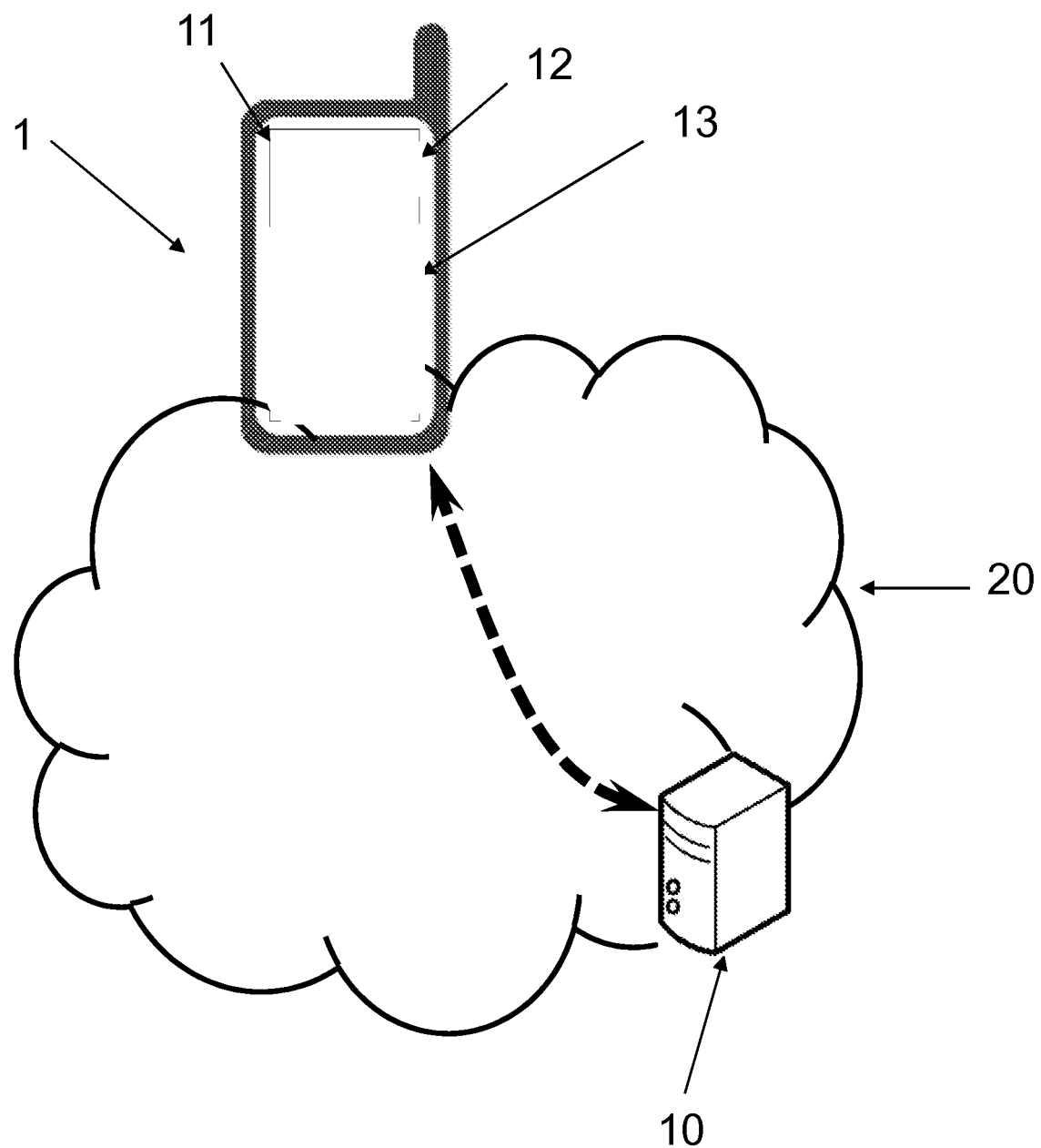
FIG. 2 illustrates an example of architecture in which the method according to the invention is performed.

The present invention relates to a method for operating a mobile terminal 1 as represented by FIG. 2. More precisely, the present method is for displaying a virtual keyboard layout, to be used for typing a response message to a received message on the mobile terminal 1.

The mobile terminal 1 is a device comprising a processing unit 11, i.e. a CPU (one or more processors), a memory 12 (for example flash memory), and a screen 13 (preferably touch sensitive) for user interface. The memory 12 is in particular for storing applications, which can be of various types, and data. The terminal 1 also typically comprises a battery, in particular a rechargeable battery (for instance lithium polymer), for powering the processing unit 11 and other units.

The terminal 1 may further comprise other units such as a location unit for providing location data representative of the position of the terminal 1 (using for example GPS, network triangulation, etc.), a communication unit for connecting (in particular wirelessly) the terminal 1 to a network 20 (for example WiFi, Bluetooth, and preferably a mobile network, in particular a GSM/UMTS/LTE network, see below), etc.

Indeed, the terminal 1 is typically a smartphone, a tablet computer, a laptop, etc. In the following description the example of a smartphone will be used.

Virtual Keyboard Layouts

Figure 3:
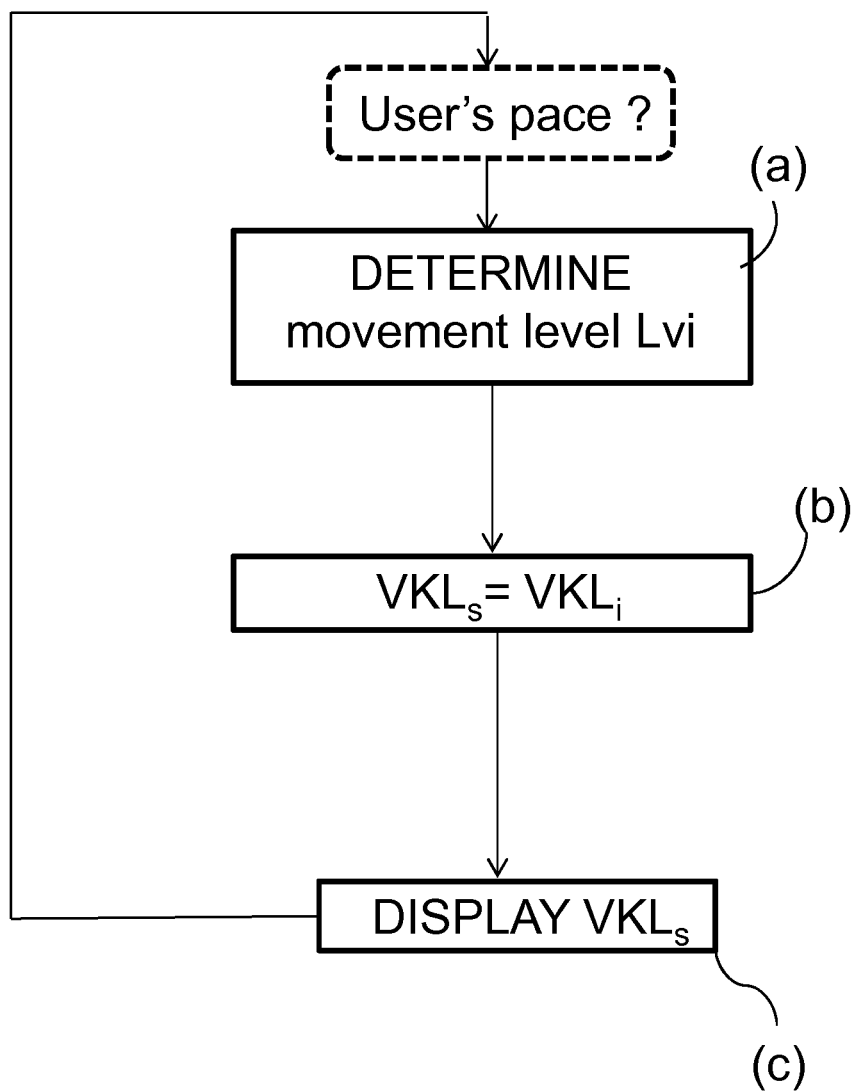
FIG. 3 illustrates an embodiment of a method for displaying a virtual keyboard layout according to the present invention.

Referring to FIG. 3 which illustrates an embodiment of a method for displaying a virtual keyboard layout according to the present invention, the present method is performed by the processing unit 11 of the terminal 1, and is implemented either by a messaging application of the terminal (a SMS client, an e-mail client, chat application, Whatsapp, etc.) or a dedicated software application.

As explained, when the user wants to type a text on the mobile terminal 1, for instance a SMS to be sent, a virtual keyboard, i.e. a "soft keyboard", is provided on the screen 13 for typing. For example, after having received a message in a messaging application, the users decide to type a response using this application. For example, a notification of reception of the message is displayed on the screen, and the user taps this notification so as to open the message in the messaging application.

As explained the virtual keyboard is provided with a plurality (i.e. n) of virtual keyboard layouts $VKL_i$ displayable on the screen 13, forming a set $\{VKL_i\}_{i\in[1;n]}$, typically including a "default" layout $VKL_1$ (in most cases the layout of the keyboard associated with the set language of the terminal 1, for instance a QWERTY-based layout if the language is English), the default layout being a so-called full-alphabetical layout. By full-alphabetical layout, it is understood a layout displaying at least each letter of a given alphabet, for instance the whole 26 letters of the Latin alphabet (or the whole 30 letters of the Cyrillic alphabet). Most of international layout are full-alphabetical layouts Normally, when a messaging application is opened, it would simply launch the virtual keyboard and display the default layout $VKL_1$, or eventually a last virtual keyboard layout selected. To the contrary, the present method proposes, when the user is moving, to automatically change the layout to a better one, more fitting for text input during moving.

Movement Level

To this end, the present method comprises a first step (a) wherein the processing unit 11 determines a movement level of the mobile terminal 1. This analysis can be performed directly within the application, or by calling an API or another dedicated application.

The movement level is a parameter representative of whether the user holding the mobile terminal 1 is moving or not, and possibly at which speed. In other words, the movement level can be defined as a parameter reflecting the intensity of the movement of the mobile terminal.

According to a first embodiment, the movement level is a Boolean parameter (i.e. binary): the movement level can take two values, i.e. either "moving" or "non-moving".

According to a second embodiment, the movement level is a continuous parameter which can take a real value, corresponding for instance to an estimation of the user's speed.

According to a preferred third embodiment, a plurality (i.e. m) of predetermined movement levels are provided for discriminating a slow walking user from a fast walking user (it is to be understood that if m=2, this is equivalent to the first embodiment, so the first embodiment is actually a particular case of the third embodiment). It can be arbitrary decided here to rank these movement levels, the higher predetermined movement level corresponding to a situation where the user's speed is the higher (naturally, the opposite ranking is possible).

For instance, there could be:
three movement levels, like Lv1 (non-walking), Lv2 (walking), Lv3 (running);
four movement levels, like Lv1 (non-walking), Lv2 (walking), Lv3 (running slowly), Lv4 (running fast);
five movement levels, like Lv1 (non-walking), Lv2 (walking slowly), Lv3 (walking fast), Lv4 (running slowly), Lv5 (running fast);

Different ways to detect and quantify the movement level can be used here.

For instance, a pace indication of the user holding the mobile terminal 1 may be obtained, the movement level being determined as a function of this pace indication, for instance by consulting a memory 12 and checking if a movement level is stored therein in association with the value of this pace indication or with a pace value range including the value of this pace indication. The pace indication of the user can advantageously be expressed as a step frequency of the user, i.e. a number of steps done per minute.

To this end, in a first embodiment, the processing unit 11 receives angular velocity and/or acceleration data from at least one sensor, connected with or embedded in the mobile terminal 1, and determines the pace indication from said data. The sensors could be one or more gyroscope and/or one or more accelerometers. It is to be noted that most of current smartphones includes tri-axis gyroscope and accelerometers to achieve output that has six full degrees of freedom (three angular velocities plus three accelerations), and have embedded a feature for detecting steps. Algorithms for calculating a pace indication from angular velocity and/or acceleration data are well known to the skilled person.

In a second embodiment, the processing unit 11 receives a step count from a pedometer connected to the mobile terminal 1 and determines the pace indication from said step count, by calculating how many steps are done during a time unit. For instance, said pedometer could be a watch or a wrist connected to the terminal 1 through Bluetooth. It is to be noted that high-end side devices such as smartwatches (with fitness tracking and health-oriented capabilities) can directly provide the pace indication to the terminal 1 (i.e. calculate the pace indication from the step count, or from angular velocity and/or acceleration data acquired by the side device itself).

The pace indication is a parameter whose value is easy to measure and which is easy to use. Alternatively, the speed of the user could be directly determined, for instance using a GPS module of the terminal 1.

When a plurality of predetermined movement levels is provided, threshold values of step frequency can be defined for each of these movement levels. In that case, the processing unit 11 compares the obtained pace indication of the user holding the mobile terminal 1 with these threshold values for deciding which movement level applies.

Hence, for m predetermined movement levels (m>1), there are m−1 thresholds, the j-th threshold (j∈[1;m−1]) separating the j-th and the j+1-th levels. In other words, the j-th level has the j−1-th threshold as lower threshold and the j-th threshold as upper threshold (excepted for the first level which has no lower threshold and the last level which has no upper threshold).

In the case of only two movement levels (a binary classification "non-moving" vs "moving"), there is thus a single threshold. Usually, people walk 70-80 meters in one minute and 0.5 meter per step. With these parameters, it can be calculated that a pace indication of 140-160 steps per minute indicates that the user is walking. It is about 2-3 steps per seconds. A threshold of 150 steps per minute may be used for example:
If the obtained pace indication reaches or is above this threshold, then the movement level is determined to be in a "moving mode".
If the obtained pace indication is below this threshold, it is determined that the movement level is determined to be in a "non-moving mode".

In the case of three predetermined movement levels, there can be as explained two thresholds for discriminating further a walking user from a running user, with for instance a first threshold of 150 steps per minute to distinguish a walking mode from a non-moving mode, and a second threshold of 300 steps per minute to distinguish a running mode from a walking mode. In the case of four predetermined movement levels, a third threshold of 540 steps per minute can be used to distinguish a "fast running" mode from a "slow running" (considering here that a fast runner has a speed which is 3 to 5 times the speed of a walker). And so on.

Virtual Keyboard Layout Selection

In a further step (b), the processing unit 11 selects a virtual keyboard layout $VKL_s$ among the set of virtual keyboard layouts $\{VKL_i\}_{i \in [1;n]}$ (i.e. s∈[1;n]) as a function of the determined movement level.

In order to perform this step, an association between each one of the virtual keyboard layouts $\{VKL_i\}_{i \in [1;n]}$ and a movement level may be stored beforehand in memory 12 (for instance in the form of an association of indicators for respectively the virtual keyboard layouts and the memory levels), in a dedicated memory table for example. The processing unit 11 uses then the determined movement level to retrieve the virtual keyboard layout associated with this determined movement level in memory 12.

Preferably, each predetermined movement level is associated to a virtual keyboard layout $VKL_i$ of said set $\{VKL_i\}_{i \in [1;n]}$, i.e. m n, the virtual keyboard layout selected $VKL_s$ at step (b) being the virtual keyboard layout $VKL_i$ associated with the movement level determined at step (a).

The different virtual keyboard layout $VKL_i$ of said set $\{VKL_i\}_{i \in [1;n]}$ may differ by the size of the keys and/or the number of keys.

Preferably, the more a predetermined movement level corresponds to a user moving fast, the bigger is a size of keys of the virtual keyboard layout $VKL_i$ associated to this predetermined movement level (as explained before, the order of movement levels could be arbitrary reversed). It is to be noted that two consecutive movement levels could be associated to virtual keyboard layouts $VKL_i$, having the same number of soft keys (i.e. the size of keys is increasing, but the number of soft keys stays the same). At some point, the number of soft keys can decrease (for instance from 26 keys to 9 keys) for allowing bigger keys.

Thus, in an embodiment, the set of virtual keyboard layouts $\{VKL_i\}_{i \in [1;n]}$ comprises at least a first full-alphabetical layout and the ABC-9-key layout. The set of virtual keyboard layouts $\{VKL_i\}_{i \in [1;n]}$ may also comprise other versions of the full-alphabetical layout, with bigger soft keys than the first one. The set of virtual keyboard layouts $\{VKL_i\}_{i \in [1;n]}$ may also comprise a layout with a single key for voice input (click button to start voice input and click again to stop).

It might be provided that the first movement level (corresponding to the slowest movement mode) is associated with the normal full-alphabetical layout, and that the last level (corresponding to the fastest movement mode) is associated with the ABC-9-key layout or the single-key layout for voice input.

In a first example with only two levels of user movement, the first level ("non-moving") is associated with the normal full-alphabetical layout $VKL_1$ (for instance the default QWERTY-based layout) and the second level ("moving") is associated with the ABC-9-key layout $VKL_2$.

In a second example with three levels of user movement, the first level ("non-moving") is associated with the normal full-alphabetical layout $VKL_1$ (for instance the default QWERTY-based layout), the second level ("walking") associated with a full-alphabetical layout $VKL_2$ with the size of keys slightly increased but keeping full-screen layout and the third level ("running") is associated with the ABC-9-key layout $VKL_3$.

In a third example with four levels of user movement, the first level ("non-moving") is associated with the normal full-alphabetical layout $VKL_1$ (for instance the default QWERTY-based layout), the second level ("walking") associated with a full-alphabetical layout $VKL_2$ with the size of keys slightly increased but keeping full-alphabetical layout, the third level ("running slowly") is associated with the ABC-9-key layout $VKL_3$, and the fourth level ("running fast") associated with the single-key layout for voice input $VKL_4$.

In a fourth example with five levels of user movement, the first level ("non-moving") is associated with the normal full-alphabetical layout $VKL_1$ (for instance the default QWERTY-based layout), the second level ("walking slowly") associated with a full-alphabetical layout $VKL_2$ with the size of keys slightly increased but keeping full-alphabetical layout, the third level ("walking fast") is associated with the normal ABC-9-key layout $VKL_3$, the fourth level ("running slowly") associated with an ABC-9-key layout $VKL_4$ with the size of keys slightly increased, and the fifth level ("running fast") associated with the single-key layout for voice input $VKL_5$.

Finally, once the virtual keyboard layout $VKL_s$ has been selected among the set of virtual keyboard layouts $\{VKL_i\}_{i \in [1;n]}$, this virtual keyboard layout $VKL_s$ is displayed on screen 13 of the mobile terminal (step (c)).

These steps a) to c) can be performed again as soon as a change in the movement level is detected by the mobile terminal. For instance, while a selected virtual keyboard layout is displayed, the user's pace can be monitored, continuously or at regular intervals, by a sensor connected to or embedded in the mobile terminal, in order to detect a possible movement level change (e.g. when the user's pace indication falls below or rises above a predetermined threshold as previously discussed). If that happens, such an event trigger step a) as previously mentioned, and a new movement level can be determined, possibly triggering the display of another virtual keyboard layout.

In an embodiment wherein the screen 13 of the mobile terminal may use several display orientation mode (for instance a landscape orientation mode and a portrait orientation mode) depending on the mobile orientation, the selection of the virtual keyboard layout $VKL_s$ is performed (step b) among a set of virtual keyboard layouts $\{VKL_i\}_{i \in [1;n]}$ designed for the current display orientation mode of the screen 13. The current display orientation mode is the display orientation mode currently used by the screen 13, i.e. used by the screen 13 at the time of the selection.

In other words, when for instance the screen 13 may be used in either a portrait or a landscape orientation mode, a first set of virtual keyboard layouts specially designed for the portrait orientation mode may be provided while a second set of virtual keyboard layouts specially designed for the landscape orientation mode may be provided. In such a scenario, if the screen 13 is using the portrait landscape orientation mode at the time of selecting virtual keyboard layout $VKL_s$, the selection will be performed only among the first set of virtual keyboard layouts, while none of the virtual keyboard layouts of the second set can be selected.

Once selected, the virtual keyboard layout $VKL_s$ is then displayed on the screen 13 without having to change the display orientation mode.

Terminal and Computer Program

The present invention also proposes a mobile terminal 1 comprising a processing unit 11 and a screen 13 (preferably a touchscreen) for preforming the aforementioned method. This terminal 1 may also comprise a memory 12.

The aforementioned processing unit 11 is in particular configured to implement, preferably when being requested the typing of a text using a virtual keyboard provided with a set of layouts of the virtual keyboard displayable on the screen, the steps of:

determining a movement level of the mobile terminal 1;
selecting a virtual keyboard layout VKLs, among a set of virtual keyboard layouts $\{VKL_i\}_{i \in [1;n]}$ displayable on a screen 13 of the mobile terminal, as a function of the determined movement level.

The screen 13 is configured to display the selected virtual keyboard layout $VKL_s$.

The invention further proposes a computer program product, comprising code instructions for executing (in particular with a processing unit 11 of the terminal 1) the previously described method, as well as a computer-readable medium (in particular a memory 12 of the terminal 1), on which is stored a computer program product comprising code instructions for executing said method. In particular, this computer program product may correspond to the possibly dedicated software application discussed previously, and/or a messaging application.

Although the invention has been previously described with reference to certain specific embodiments, it is to be understood that various modifications and improvements can be made without departing from the scope of the invention as defined in the appended claims. For instance, while an automatic virtual keyboard layout switching method has been introduced beforehand in the context of a messaging application opening on a mobile terminal, such a switching method can naturally apply at any time during a text conversation, even after the opening of a messaging application.

The invention claimed is:

1. A method for displaying a virtual keyboard layout on a mobile terminal, the method comprising:
   storing a set of virtual keyboard layouts displayable on a screen of the mobile terminal, the virtual keyboard layouts being configured to input a string of characters on the mobile terminal;
   determining, by a processing unit of the mobile terminal, a movement level of the mobile terminal;
   selecting, by the processing unit, a virtual keyboard layout configured to input a string of characters, among the stored set of virtual keyboard layouts displayable on a screen of the mobile terminal, based at least partly on the determined movement level of the mobile terminal; and
   displaying the selected virtual keyboard layout on the screen.

2. The method of claim 1, wherein the selection of the virtual keyboard layout is performed among a set of virtual keyboard layouts designed for a current display orientation mode of the screen.

3. The method of claim 1, further comprising obtaining, by the processing unit, a pace indication of a user holding the mobile terminal, the movement level being determined based at least partly on the pace indication.

4. The method of claim 3, further comprising receiving, by the processing unit, at least one of acceleration data and angular velocity data from at least one sensor and calculating the pace indication from the at least one of acceleration data and angular velocity data.

5. The method of claim 3, further comprising receiving, by the processing unit, a step count from a pedometer connected to the mobile terminal and calculating the pace indication from the step count.

6. The method of claim 1, wherein the movement level is selected among a plurality of predetermined movement levels, each predetermined movement level being associated to a virtual keyboard layout of the set, and wherein the virtual keyboard layout selected is associated with the movement level.

7. The method of claim 6, wherein the predetermined movement levels are defined by threshold values of pace indication, the method further comprising comparing the obtained pace indication of the user holding the mobile terminal with the threshold values.

8. The method of claim 6, wherein the size of keys of the virtual keyboard layout is based at least partly on the predetermined movement levels.

9. The method of claim 1, wherein the set of virtual keyboard layouts comprises at least a full-alphabetical layout and a ABC-9-key layout.

10. The method of claim 9, wherein the set of virtual keyboard layouts further comprises a single-key layout for voice input.

11. A mobile terminal comprising a processing unit, a memory and a screen, the processing unit being configured to:
   store a set of virtual keyboard layouts displayable on a screen of the mobile terminal, the virtual keyboard layouts being configured to input a string of characters on the mobile terminal;
   determine a movement level of the mobile terminal;
   select a virtual keyboard layout configured to input a string of characters among the stored set of virtual keyboard layouts displayable on the screen of the mobile terminal, based at least partly on the determined movement level, for display by the screen.

12. The mobile terminal of claim 11, wherein the processing unit is further configured to perform the selection of the virtual keyboard layout among a set of virtual keyboard layouts designed for a current display orientation mode of the screen.

13. A non-transitory computer-readable medium, on which is stored a computer program product comprising code instructions for executing the method of claim 1 for displaying a virtual keyboard layout to be used for typing a text on a mobile terminal.

14. The method of claim 1, further comprising:
   determining a first display orientation mode from a plurality of display orientation modes, wherein the first display orientation mode is associated with the display orientation mode currently displayed on the screen of the mobile terminal;
   detecting a change in the display orientation mode displayed on the screen of the mobile terminal;
   determining a second display orientation mode based at least partly on the detected change in the display orientation mode;
   selecting a virtual keyboard layout associated with the second display orientation mode; and
   displaying the virtual keyboard layout associated with the second display orientation mode.

15. The method of claim 14, wherein the first display orientation mode is associated with a first set of virtual keyboard layouts and the second display orientation mode is associated with a second set of virtual keyboard layouts.

16. The method of claim 5, wherein each of the predetermined movement levels is associated with a threshold step frequency value.

17. The method of claim 16, wherein the step frequency value measures the number of steps taken by a user over a predetermined time interval.

18. The method of claim 1, wherein each of the virtual keyboard layouts differ by at least one of the size of keys and the number of keys displayed on the virtual keyboard layout.

19. The method of claim 1, wherein the movement level of the mobile terminal is monitored at predetermined intervals in order to detect a movement level change.

20. The method of claim 4, wherein the at least one sensor comprises a gyroscope and an accelerometer.

21. The method of claim 1, wherein determining, by the processing unit of the mobile terminal, a movement level of the mobile terminal includes determining the movement level of the mobile terminal in an environment of a user of the mobile terminal.

* * * * *